United States Patent [19]

Dahle et al.

[11] 4,408,496
[45] Oct. 11, 1983

[54] PRESSURE-SENSING TRANSDUCER

[75] Inventors: Orvar Dahle, Västerås; Bertil Hoffman, Kolbäck; Jan Nordvall, Västerås; Sture Siby, Västerås; Åke Widehn, Västerås, all of Sweden

[73] Assignee: ASEA Aktiebolag, Västerås, Sweden

[21] Appl. No.: 243,450

[22] Filed: Mar. 13, 1981

[30] Foreign Application Priority Data

Mar. 19, 1980 [SE] Sweden .............................. 8002137

[51] Int. Cl.³ .............................................. G01L 9/10
[52] U.S. Cl. ...................................... 73/728; 73/722; 73/720; 73/DIG. 2
[58] Field of Search ................. 73/728, 726, 727, 722, 73/720, 721, DIG. 2, 706, 781, 782, 715, 432 A

[56] References Cited

U.S. PATENT DOCUMENTS

| | | | |
|---|---|---|---|
| 2,472,047 | 5/1949 | Ruge | 73/862.38 |
| 2,564,416 | 8/1951 | Wildhack | 73/781 |
| 2,895,332 | 7/1959 | Dahle | 73/862.69 |
| 3,082,621 | 3/1963 | Soderholm | 73/855 |
| 3,413,845 | 12/1968 | Pugnaire | 73/726 |
| 3,857,287 | 12/1974 | Sonderegger | 73/706 |
| 4,166,396 | 9/1979 | Baker | 73/706 |
| 4,193,294 | 3/1980 | Forslund | 73/DIG. 2 |

Primary Examiner—E. R. Kazenske
Assistant Examiner—J. Chapman
Attorney, Agent, or Firm—Watson, Cole, Grindle & Watson

[57] ABSTRACT

A pressure-sensing transducer which can be used to continuously measure the pressure in the cylinder of an internal combustion engine comprising a pressure-transmitting element which includes a generally tubular seat and a metallic plate which closes off a top end of the seat, an M-shaped force-transmitting member which spans across the top end of the seat, the outer legs of the M-shaped member being connected to opposite portions of the top end of the seat and the inner legs being connected to the center of the metallic plate, and a magnetoelastic force-sensing member connected between the outer legs of the M-shaped member, such that pressure-generated forces applied to the metallic plate from within the generally tubular seat are transformed into a tensile force acting on the force-sensing member in a direction perpendicular to the longitudinal axis through the generally tubular seat.

7 Claims, 5 Drawing Figures

PRIOR ART

PRESSURE-SENSING TRANSDUCER

TECHNICAL FIELD

This invention relates to a pressure-sensing transducer which is primarily, although not exclusively, intended for dynamic pressure indication at high temperatures. A typical application of such a transducer is for indicating or providing a continuous measurement of cylinder pressure in an internal combustion engine, for example a diesel engine.

BACKGROUND ART

Heavy demands are placed on measuring equipment employed for measuring pressure or pressure variations in severe environments, for example at temperatures approaching 450° C. Previously, when employing a pressure-sensing transducer to provide a continuous measurement of cylinder pressure in a diesel engine, it has been found necessary either to isolate a measuring body of the transducer from heat flux in the transducer or to arrange for the transducer to be air- or water-cooled. However, neither of these solutions is completely satisfactory since in the former case the transducers designed have been relatively large and expensive and in the latter case the provision of air- or water-cooling complicates the design of the transducer.

The present invention aims to provide a solution to the above-mentioned problems and other problems associated therewith.

SUMMARY OF THE INVENTION

According to the present invention a pressure-sensing transducer comprises (a) a pressure-sensing means having support means and diaphragm means, the diaphragm means being movable relative to the support means in a first direction which is parallel to the direction of the pressure to be sensed, (b) a force-transmitting means which spans across the support means and the diaphragm means, (c) and a force-sensing means which comprises a measuring means and a transducer element attached to first and second portions of the force-transmitting means, the first and second portions being spaced from the diaphragm means in the first direction and being spaced from each other in a second direction perpendicular to the first direction. The force-transmitting means is adapted and arranged to transmit a pressure-generated force applied to the diaphragm means parallel to the first direction into counteracting forces applied to the transducer element via the first and second portions in directions parallel to the second direction to generate mechanical stress in the transducer element which is sensed by the measuring means to provide an electrical signal which is a function of the pressure being sensed.

In a particularly preferred embodiment of the pressure sensing transducer the force-transmitting means is substantially M-shaped and comprises a pair of outer legs, each connected at its lower end to the support means, and an intermediate part connected at a mid-point region thereof to a mid-point region of the diaphragm means, the first and second portions being provided by upper regions of the outer legs.

Because in use the transducer element is subjected to forces parallel to the second direction, and thus is positioned substantially perpendicular to the heat flux in the first direction, the effect of the temperature gradient on the measurement result will be negligible, and the problem of heat-insulating the transducer is thus dispensed with. This is particularly apparent when the transducer element is in the form of a plate having a small dimension in the first diretion.

BRIEF DESCRIPTION OF THE DRAWINGS

The invention will now be described, by way of example, with reference to the accompanying drawing, in which.

DESCRIPTION OF THE PREFERRED EMBODIMENTS

Figure 1:
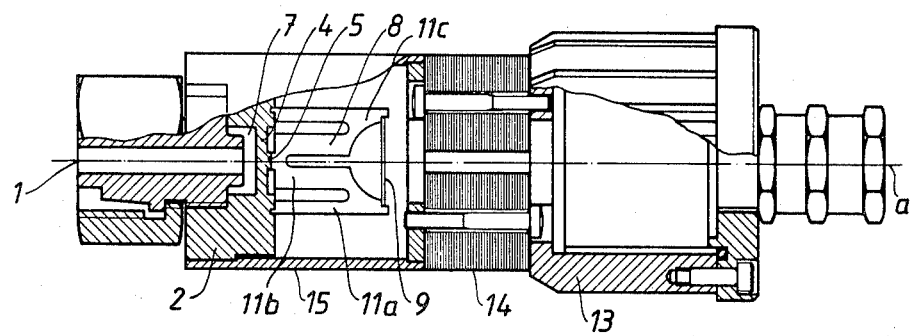
FIG. 1 is a side view, partly in longitudinal section, of a transducer according to the invention.

FIG. 1 shows a pressure-sensing transducer for continuous measurement of the pressure inside a cylinder (not shown) of a diesel engine (not shown). The transducer has a longitudinal axis a and comprises a channel 1 which is adapted to communicate with the cylinder space (not shown). The channel 1 at its inner end opens into a cavity 7 which is closed by a metallic, diaphragm-like plate 4 which is, by way of example, in the form of a circular plate provided on its side remote from the channel 1 with a centrally positioned projection or lug 5. The plate 4 is formed integrally with a surrounding, generally tubular seat 2, although it is possible for the plate 4 to be a separate element which is permanently attached to the seat 2. The transducer further comprises a force-transmitting member 8 which spans across the seat 2 and the plate 4 and which carries a force-sensing member 9 axially spaced along the axis a from the plate 4. The force-transmitting member 8 is constructed so as to convert a compressive force applied to the member 8 due to movement of the plate 4 relative to the seat 2 in a first direction parallel to the longitudinal axis a of the transducer into a tensile force applied to the force-sensing member 9. In use of the transducer, the plate 4 moves relative to the seat 2, parallel to the longitudinal axis a of the transducer, in response to sensing changes in pressure in the cylinder space, the pressure changes being transmitted to the plate 4 via the channel 1.

The force-transmitting member 8 is suitably designed to have the shape of a capital "M" and has a pair of spaced apart outer leg portions 11a connected at their upper ends to an intermediate part formed of inner leg portions 11b, the connection of each outer leg portion 11a to the inner leg portions 11b being via circular sector portions 11c. The lower ends of the outer leg portions 11 11a of the force-transmitting member 8 are fixed, e.g. by welding or hard soldering, to opposite points on the upper end of the seat 2 and a central or mid-point region of the intermediate part of the force-transmitting member 8 is attached, e.g. by welding or hard soldering, to the centrally located lug 5 of the plate 4. The force-sensing member 9 influenced by the member 8 may typically be a magnetoelastic transducer, for example of the type disclosed in U.S. Pat. No. 2,895,332. Alternatively, the force-sensing member 9 may also consist of other such members known within the art, for example a plate with strain gauges. In this latter case the force-sensing member is designed so as to endure the high temperatures, for example approaching 450° C., which may occur in a diesel engine.

The pressure transducer shown in FIG. 1 consists of a first part designed to become hot in use, this first part comprising a pressure-transmitting element which includes the seat 2 and plate 4, the force-transmitting member 8 and the force-sensing member 9; a second part 13 designed to be relatively cold in use, this second part comprising passive electronic components and cable connections; and a heat-insulating intermediate part 14 interconnecting the first and second parts. The second part 13 is suitably provided with cooling flanges. The heat-insulating intermediate part 14 is fixedly connected to the seat 2 via a protective housing 15.

Figure 2:
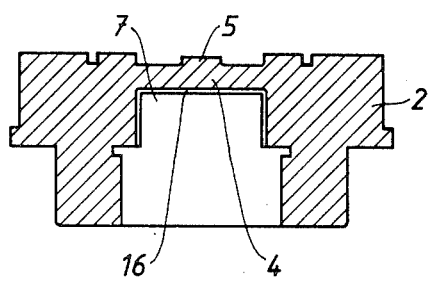
FIG. 2 is a longitudinal sectional view of a detail of the transducer shown in FIG. 1, FIGS. 3a and 3b are a plan and side view, respectively, of a transducer element of the transducer shown in FIG. 1.

FIG. 2 shows a preferred design of the pressure-sensing diaphragm-like plate 4. The side of the plate 4 which faces the cavity 7 into which the channel 1 opens into, and the side walls of the seat 2 which further define the cavity 7, are coated with a heat-resistant, heat-insulating material 16, for example a ceramic material. The reason for the presence of the heat-insulating coating material 16 is to prevent or reduce the temperature pulsation of the force-sensing member 9, which would otherwise arise because of the strong temperature variations in the cavity 7 caused by the rapid adiabatic pressure variations in the channel 1.

Figure 3A:
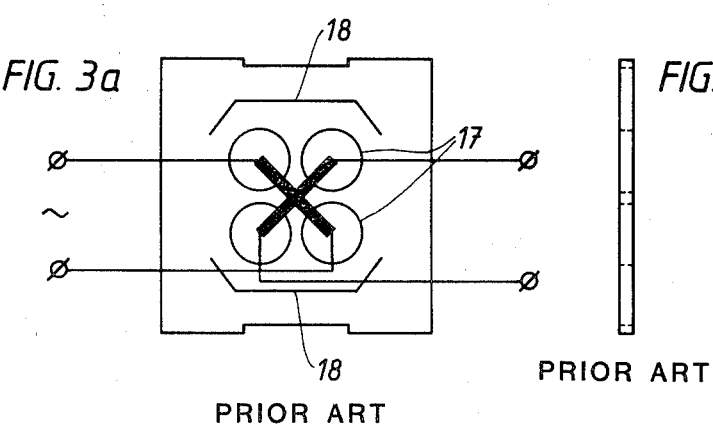
FIG. 3c is a force versus electrical output voltage measurement curve showing in dashed lines the deviations of the output voltage from the ideal straight line, shown in full lines when the transducer element shown in FIGS. 3a and 3b is subjected to a compressive or a tensile force.
Figure 3B:
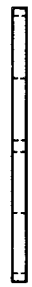
Figure 3C:
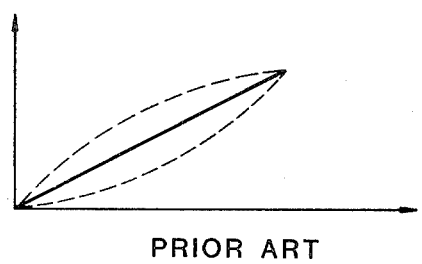

FIGS. 3a and 3b show an example of a suitable embodiment of the force-sensing member 9 in the form of a plate-like transducer element. In a known manner the transducer element is provided with four apertures 17, two diagonal apertures being used for an excitation winding (not shown) and the two other diagonal apertures being used for a measuring winding (not shown). Since the force-transmitting member 8 transforms compressive force into tensile force, which results in a poor linearity in the output signal of such a transducer element with only four apertures, the transducer element is provided with two slots 18. These slots 18, in a known manner, influence the relationship between tensile stress in the working direction and compressive stress in the transverse direction in order to obtain, as far as possible, a linear output signal as described in U.S. Pat. No. 4,193,294. FIG. 3c shows examples of measurement curves, where the unbroken line represents the desired, ideal linear curve and the two dashed lines represent, with exaggerated non-linearity, the signal components caused by the above-mentioned tensile and compressive stresses.

The invention according to the above description may be varied in many ways within the scope of the following claims.

What is claimed is:

1. A pressure-sensing transducer which can be used to continuously measure the cylinder pressure in an internal combustion engine, said pressure-sensing transducer comprising a pressure-transmitting element which includes a generally tubular seat having a bottom end and a top end and defining a longitudinal axis therethrough, and a metallic plate which closes off the top end of said seat so as to form a cavity within said seat into which hot gases from an internal combustion engine can flow, said metallic plate including a centrally located projection portion extending away from its side opposite the cavity in said seat, a generally M-shaped force transmitting member having two outer legs and two inner legs, the bottom ends of the two inner legs being connected together and the top ends of the two inner legs being respectively connected to the top ends of the two outer legs, the bottom ends of the two outer legs being connected to opposite portions of the top end of said seat and the bottom ends of the two inner legs being connected to the projection portion of said metallic plate, and a force-sensing member connected between the top ends of the two outer legs of said generally M-shaped force-transmitting member so as to be oriented generally perpendicularly with respect to said longitudinal axis, said force-sensing member comprising a plate having four apertures therein, two of the apertures supporting an excitation winding and two of the apertures supporting a measuring winding, such that pressure forces acting along said longitudinal axis on said metallic plate from within said cavity will be transmitted by said force-transmitting member so as to create tensile forces in said force-sensing member measurable by said measuring winding.

2. The pressure sensing transducer according to claim 1 wherein said metallic plate is oriented generally perpendicularly with respect to said longitudinal axis.

3. The pressure-sensing transducer according to claim 1 wherein said metallic plate is formed integrally with said generally tubular seat.

4. The pressure-sensing transducer according to claim 1 wherein a heat-insulating coating is provided on the side of said metallic plate facing the cavity in said seat.

5. The pressure-sensing transducer according to claim 1 wherein a first end of a hollow protective housing is connected to said generally tubular seat and extends away from the top end thereof to enclose said generally M-shaped force-transmitting member and said force-sensing member, and wherein a heat-insulating intermediate part is connected to the second end of said hollow protective housing.

6. The pressure-sensing transducer according to claim 5 including a connector member connected to said heat-insulating intermediate part on a side thereof opposite said generally tubular seat, said connector member including electronic components and cable connections for said excitation and measuring windings.

7. The pressure-sensing transducer according to claim 1 including attachment means connected to the bottom end of said generally tubular seat, said attachment means including a flow channel therethrough capable of conveying hot gases from the cylinder of an internal combustion engine to said cavity.

* * * * *